UNITED STATES PATENT OFFICE.

AUGUSTE J. ROSSI AND LOUIS E. BARTON, OF NIAGARA FALLS, NEW YORK, ASSIGNORS TO THE TITANIUM ALLOY MANUFACTURING COMPANY, OF NEW YORK, N. Y., A CORPORATION OF MAINE.

METHOD OF OBTAINING TITANIC OXID.

1,106,410.      Specification of Letters Patent.     Patented Aug. 11, 1914.

No Drawing.     Application filed February 6, 1913.    Serial No. 746,568.

*To all whom it may concern:*

Be it known that we, AUGUSTE J. ROSSI and LOUIS E. BARTON, both citizens of the United States, and residents of Niagara Falls, in the county of Niagara and State of New York, have jointly invented certain new and useful Improvements in Methods of Obtaining Titanic Oxid, of which the following is a specification.

Our present invention relates to methods for deriving titanic oxid concentrates from substances containing such oxid and iron oxid, especially such substances containing comparatively high percentages of iron oxid, as for example ordinary titaniferous iron, or ilmenite, ores, as distinguished from such substances containing low percentages of iron oxid and known for example as "Rutile" ores.

The objects of our invention comprise provision of a novel, industrially practicable, method, whereby, from such substances, may be obtained, at less cost, loss, labor and skill, and with greater certainty than formerly, concentrate products containing exceptionally high percentages of titanic oxid, and exceptionally low, if any, percentages of iron oxid or other undesirable substances, and possessing also properties especially adapting them for certain uses.

We have discovered that by, as a preliminary step, charging and melting, together with said substances, and carbon, the acid or neutral sulfate of an alkali metal as such, preferably a sodium sulfate, as for example contained in the, as we believe, hitherto substantially waste by-product of the manufacture of nitric acid commonly designated as "niter cake", the which consists principally of acid sodium sulfate, *i. e.* sodium bisulfate, our resulting fusion, and melt, is attended by reactions and characteristics which we believe have been hitherto unutilized in this art and by aid of which attainment of our said objects is facilitated and otherwise promoted. We have, for example, practised our novel method as follows:—

With a titaniferous, or ilmenite, iron ore analyzing—

| | |
|---|---|
| Silica | 2.58% |
| Alumina | 4.08 |
| Iron oxid | 40.19 |
| Titanic oxid | 52.00 |
| | 98.85% | we mixed therewith "niter cake" of the following composition by analysis—

| | |
|---|---|
| Acid sodium sulfate | 97.07 |
| Moisture | 2.93 |
| | 100.00 |

With the aforesaid mixture we further mixed, as the carbon constituent of our charge, petroleum coke. In this instance, as is preferable, we proportioned the said constituents of the charge as follows, viz:—

| | |
|---|---|
| Ore | 100 parts |
| Niter cake | 300 parts |
| Coke | 50 parts |

The proportion of the sulfate of the alkali metal added is preferably somewhat in excess of what is required to insure formation of ferrous sulfid from all the iron constituents of the ore, of titanate of the alkali metal from titanium constituents, and of alkali silicates and aluminates from silica and alumina of the gangue, such excess insuring a more desirable, less acid, titanate, and moreover such liberal allowance of niter cake results in increasing the fusibility of the charge and facilitating its casting, also the melt is more readily decomposed by water as herinafter stated, more iron being extracted as ferro sodium sulfid and separated from the titanic oxid by such water, and the excess salts are easily recovered. We usually therefore prefer to proportion our charge substantially as per the table above given.

It is preferable that the carbon employed be low in ash, hence our preference for petroleum coke, though other forms of carbon, as the reducing agent might be used.

We thoroughly melted our charge as above constituted in a carbon lined electric furnace, though of course any other type of furnace capable of developing and maintaining the required temperature, as for example a reverberatory furnace, might be employed, likewise other such furnaces provided with any other sufficiently refractory linings.

During our melt we believe that the following reaction occurs predominantly, viz:—

$$FeTiO_3 + NaSO_4 + 2C = FeS + Na_2TiO_3 + 2CO_2$$

also to a very much less, if not unimportant, extent the following reaction, viz:—

$$2FeTiO_3 + 2Na_2SO_4 + 6C = 2Na_2FeS + Ti_2O_3 + CO + 5CO_2$$

In addition to these and other reactions, silica and alumina of the ore were respectively converted to silicates and aluminates of soda.

We withdraw our resulting melt from the furnace in any convenient manner, and then cool it. It is, we believe, of a desirable consistency and quality hitherto unattained in this art. Though it comes from the furnace as a molten slag capable of being cast and solidified into a solid mass, it is comminutable with exceptional ease, and, if crushed to only about one-quarter inch mesh, will, after one or two days' exposure to the atmosphere, disintegrate into a fine powder very serviceable for our purposes. On the other hand, if so crushed immediately after cooling, its nature and consistency is such as to admit of its immediate successful use in that form in the hereafter described next following step of our process.

We lixiviated our said melt with water. We believe that, during the lixiviation, the following reactions occurred: (1) excess sodium salts dissolved; (2) much iron passed into solution as a ferro sodium sulfid; (3) sodium titanate was decomposed, forming hydrated titanic oxid and sodium hydrate; (4) sodium silicate and sodium aluminate were dissolved.

We prefer to lixiviate first with cold, or merely warm, water, which, owing to the nature and consistency of our melt, operates to dissolve most of the salts, and then we finally lixiviate with hot or boiling water, this being for the purpose of hastening completion of the decomposition of the titanate. The residue, insoluble in water, separated from the solution, as by decanting, we boil in a bath containing acid so dilute as to dissolve the therein iron, but not the therein titanium, compounds. By this treatment we dissolve substantially all the remaining iron compounds of sulfur, and also decompose any small amount of sodium titanate which may have escaped our said lixiviation with water. We prefer to employ in the bath for this purpose dilute sulfuric acid, because of its superior economy and efficiency under the circumstances, but other acids sufficiently diluted as above described, as for instance hydrochloric, might, though less advantageously, be employed. The proportion of acid should in all cases be determined by analysis of the aforesaid residues insoluble in water, and need be only slightly in excess of the theoretical quantity, of sulfuric acid for example, required by the equations—

$$FeS + H_2SO_4 = FeSO_4 + H_2S$$

$$Na_2O + H_2SO_4 = Na_2SO_4 + H_2O$$

as based upon the percentages of iron sulfur compounds, and of soda, found by the analysis.

The bath we prefer to dilute so as not to contain over 20% of actual acid.

The undissolved residue of the bath will be found to contain the resultant of substantially all of the titanic oxid of the ore, or substance treated, being that which settles therein after boiling has ceased. This being separated from the bath, as by decantation, and dried, will appear as an amorphous powder varying in color from darkish to light gray, but by calcining it, in any convenient manner, as the final step in our process, we obtain as a final product a substantially white, somewhat granular, and gritty, concentrate consisting essentially of titanic oxid and an exceptionally low percentage of iron oxid, say from one-half to one per cent.

It will be noted that the titanic oxid of the ore, or substance, treated appears as such in our final product without having at any time been in solution, the which we regard as an advantage, and its temporary combination with sodium, as in the titanate, serving only the purpose of separating effectively the titanic oxid from its natural, refractory, combination with the iron oxid as in the ilmenite molecule.

It will be appreciated that our said method of concentration is different, and distinct, from the heretofore suggested method by aid of fusion of titaniferous iron ores with bisulfate of soda. Without mentioning other differences it suffices to say that in the latter carbon is not employed, or relied on, and that its bisulfate operates to convert the iron and titanium oxids into water-soluble iron and titanium sulfates.

It will be understood that while we prefer to preliminarily mix together the titaniferous substance, carbon, and sulfate of the alkali metal before charging and melting, the said mixing might, though unpreferably, be accomplished in any order, or at any stage, of the single operation or heat by which we prepare our said melt, without departing from our invention.

What we claim as new and desire to secure by Letters Patent is the following, viz:—

1. The method of obtaining titanic oxid from a substance containing it and iron oxid which comprises charging and melting together with carbon and said substance sulfate of an alkali metal, lixiviating the resulting melt with water, withdrawing the undissolved portion of said melt, and boiling it in a bath containing acid so dilute as to dissolve the therein iron, but not the therein titanium, compounds.

2. The method of obtaining titanic oxid from a substance containing it and iron oxid which comprises charging and melting together with carbon and said substance sodium sulfate, lixiviating the resulting melt with water, withdrawing the undissolved portion of said melt, and boiling it in a bath containing acid so dilute as to dissolve the therein iron, but not the therein titanium, compounds.

3. The method of obtaining titanic oxid from a substance containing it and iron oxid which comprises charging and melting together with carbon and said substance sulfate of an alkali metal, lixiviating the resulting melt with water, withdrawing the undissolved portion of said melt, and boiling it in a bath containing sulfuric acid so dilute as to dissolve the therein iron, but not the therein titanium, compounds.

4. The method of obtaining titanic oxid from a substance containing it and iron oxid which comprises charging and melting together with carbon and said substance sodium sulfate, lixiviating the resulting melt with water, withdrawing the undissolved portion of said melt, and boiling it in a bath containing sulfuric acid so dilute as to dissolve the therein iron, but not the therein titanium, compounds.

5. The method of obtaining titanic oxid from a substance containing it and iron oxid which comprises charging and melting together with carbon and said substance sulfate of an alkali metal, lixiviating the resulting melt with water, withdrawing the undissolved portion of said melt, boiling it in a bath containing acid so dilute as to dissolve the therein iron, but not the therein titanium, compounds, and calcining the undissolved residue.

6. The method of obtaining titanic oxid from a substance containing it and iron oxid which comprises charging and melting together with carbon and said substance sodium sulfate, lixiviating the resulting melt with water, withdrawing the undissolved portion of said melt, and boiling it in a bath containing acid so dilute as to dissolve the therein iron, but not the therein titanium, compounds, and calcining the undissolved residue.

7. The method of obtaining titanic oxid from a substance containing it and iron oxid which comprises charging and melting together with carbon and said substance sulfate of an alkali metal, lixiviating the resulting melt with water, withdrawing the undissolved portion of said melt, boiling it in a bath containing sulfuric acid so dilute as to dissolve the therein iron, but not the therein titanium, compounds, and calcining the undissolved residue.

8. The method of obtaining titanic oxid from a substance containing it and iron oxid which comprises charging and melting together with carbon and said substance sodium sulfate, lixiviating the resulting melt with water, withdrawing the undissolved portion of said melt, boiling it in a bath containing sulfuric acid so dilute as to dissolve the therein iron, but not the therein titanium, compounds, and calcining the undissolved residue.

9. In obtaining titanic oxid from a substance containing it and iron oxid the steps which consist in making, in one operation or heat, a melt from sulfate of an alkali metal charged as such, therewith intermixed carbon, and said substance and thereafter lixiviating the resulting melt with water.

10. In obtaining titanic oxid from a substance containing it and iron oxid the steps which consist in making, in one operation or heat, a melt from a sodium sulfate charged as such, therewith intermixed carbon, and said substance, and thereafter lixiviating the resulting melt with water.

AUGUSTE J. ROSSI.
LOUIS E. BARTON.

Witnesses:
WALTER D. EDMONDS,
PHILIP C. PECK.